United States Patent [19]

Cocca et al.

[11] 4,186,232

[45] Jan. 29, 1980

[54] SELF-SUPPORTING ROOF PANEL OF PLASTIC MATERIAL FOR MOTOR VEHICLES AND THE LIKE

[75] Inventors: Vincenzo Cocca, Cormano; Ivano Tommasi, Senago; Pasqualino Cau, Oggiono, all of Italy

[73] Assignee: Montedison S.p.A., Milan, Italy

[21] Appl. No.: 919,448

[22] Filed: Jun. 27, 1978

[30] Foreign Application Priority Data

Jul. 1, 1977 [IT] Italy ................... 25298 A/77

[51] Int. Cl.² ................. B32B 1/04; B32B 3/02
[52] U.S. Cl. .................. 428/177; 296/137 A; 428/310
[58] Field of Search ............ 296/137 R, 137 A; 428/174, 178, 177, 121, 130, 310, 314, 315

[56] References Cited

U.S. PATENT DOCUMENTS

| | | | |
|---|---|---|---|
| 4,020,207 | 4/1977 | Alfter et al. | 428/315 |
| 4,043,589 | 8/1977 | Alfter et al. | 296/137 A |
| 4,119,749 | 10/1978 | Roth et al. | 428/315 |
| 4,131,702 | 12/1978 | Alfter et al. | 428/314 |

*Primary Examiner*—William J. Van Balen
*Attorney, Agent, or Firm*—Stevens, Davis, Miller & Mosher

[57] ABSTRACT

A self-supporting roof plate for motor vehicles and the like is disclosed, characterized in that said roof plate consists essentially of a composite structure comprising a plate of rigid thermoplastic material bonded to a layer of foamed plastic material having a thermo-acoustical insulating function, and a layer of an aesthetically pleasing plastic material, said multi-layer structure being so shaped as to include on opposite sides two hook-like or S-shaped arcuate strips forming elastically yielding strips, adapted for the assemblage of the structure against the roof body of the car, by snap-fitting said arcuate strips into grooves prearranged between the roof ceiling and the body sides of the vehicle. The rigid plate may be a box-type or similar structure. The arcuate strips may be obtained by the thermo-forming of the composite structure.

3 Claims, 5 Drawing Figures

SELF-SUPPORTING ROOF PANEL OF PLASTIC MATERIAL FOR MOTOR VEHICLES AND THE LIKE

The present invention relates to a self-supporting roof panel for motor vehicles and the like, made entirely of plastic material and fittable to the ceiling of the vehicle by a simple snap fitting or jointing, without the use of reinforcements and without any special coupling or attachment means.

As is well known, at present roof panels for motor vehicles and the like are generally made of fabrics or sheets of plastic material in accordance with various different methods which all require a considerable use of manual operations, both for the separation of the roof panel as well as for the fitting to the roof or ceiling of the car. Moreover, the roof panels of the known type do not have a self-supporting structure, by reason of which this function is normally achieved by metal structural elements.

Thus, a principal object of this invention is that of providing a self-supporting roof panel made entirely of plastic material that may readily and rapidly be fitted against the roof ceiling of the car or the like, without requiring any separate partial assemblies, fabric stretching operations, finishing operations, and/or modifications of the roof body of the car.

Another object of this invention is that of providing a roof panel having, besides the aforesaid self-supporting capacity, a thermo-acoustical insulation and well suited for allowing an easy and rapid replacement in case of accidental damage or soiling.

These and still other objects of the invention, which will become more clearly apparent from the following description, are conveniently achieved by providing a ceiling plate made of a plastic material for cars and the like vehicles which consist or consists essentially of a composite structure comprising a rigid panel of thermoplastic material coupled to a layer of foamed plastic material as thermo-acoustical insulation, and to a layer of plastic material having an aesthetically appealing finish, said multi-layer structure showing on opposite sides two strips hooklike, bent or S-shaped, suited for forming elastically yielding, joint-like coupling means to be snapped into place into grooves arranged between the ceiling and the body sides of the motor vehicle.

This invention will now be described in still more detail with reference to the attached drawings, given for purely illustrative and not limiting purposes, and exemplifying a preferred practical embodiment of this invention.

FIG. 2 shows a cross-sectional view of the same roof panel of FIG. 1, and more precisely, how it is mounted by snapping into place into the grooves provided between the roof body and the body sides of the motor vehicle; while

With reference to these figures, the self-supporting roof plate which is the object of this invention, substantially consists of a sandwich structure comprising a rigid plastic plate 1 of suitable thickness which depends on the size and shape of the roof top of the motor vehicle, and a layer or sheet 2 of foamed thermoplastic resin forming a convenient thermo-acoustical insulation.

Figure 1:
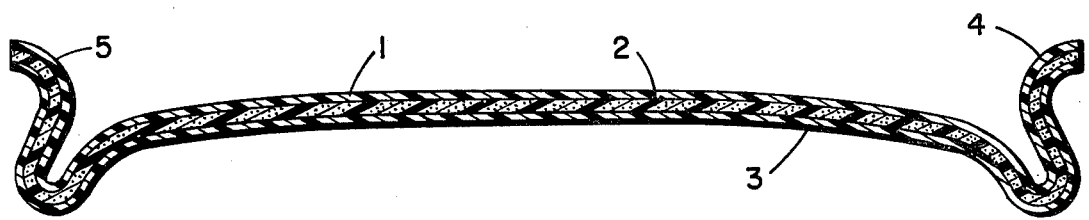
FIG. 1 is a vertical transverse sectional view of an unassembled self-supporting roof panel according to the invention, completely finished and ready for assembling.
Figure 1A:
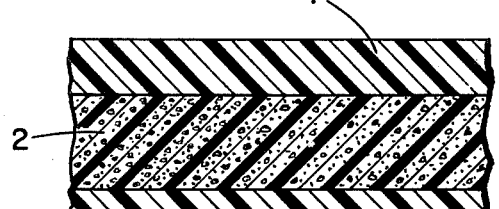
FIG. 1A is a larger scale fragmentary sectional view of the structure shown in FIG. 1.
Figure 1B:
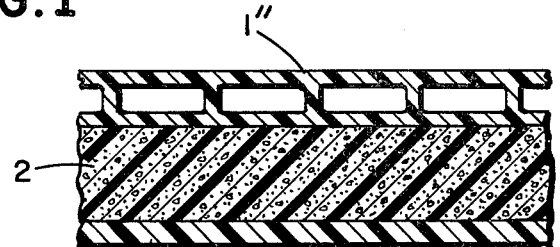
FIG. 1B is a view similar to that of FIG. 1A, showing a modified alternate structure.

Coupled to layer 2 there is a layer 3 of an aesthetically pleasing finish of plastic material, colored and decorated as desired. Layer 1, having a self-supporting function, is realized in practice with a sheet of flat plate 1', as shown in FIG. 1A, or, if the size is quite large, with a box-type structure 1", as shown in FIG. 1B.

Figure 2:
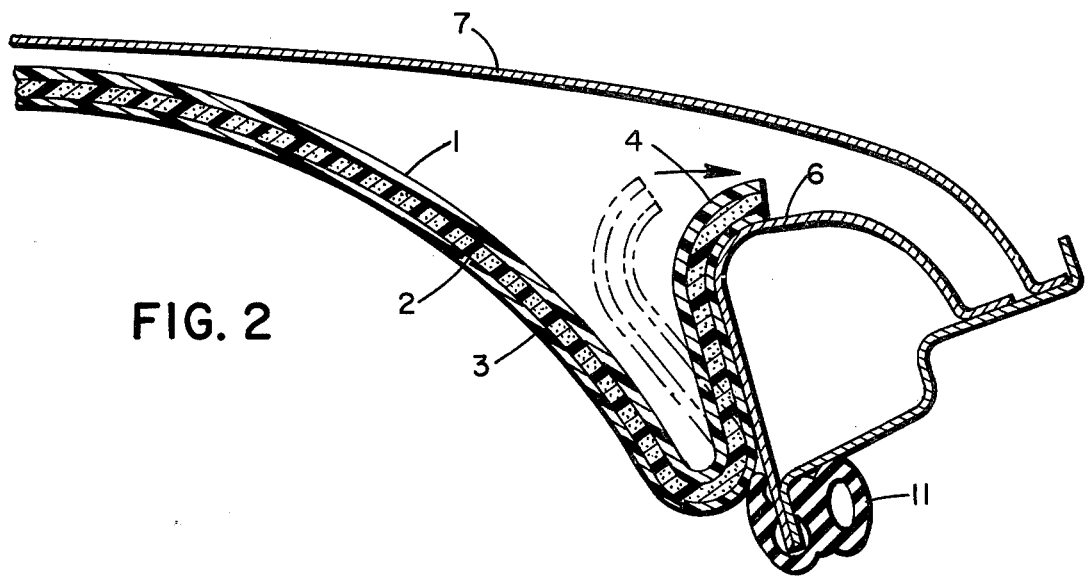

The three layers are bonded to each other automatically by conventional processes per se well known in the art of lamination. The composite structure thus obtained is then conveniently shaped at the longitudinal sides (i.e., those intended to run along the upper edges of the body sides of the motor vehicle), as shown in FIG. 2. In FIG. 2, in fact, two large lateral bands are bent arcuately upwards in such a way as to form two elastic wings 4 and 5 (FIG. 1) with a profile corresponding to profile 6 (FIG. 2) of the upper boxed edge of the car. The upper shape of the lateral wings is realized in practice by the conventional thermo-forming of the sandwich.

Figure 3:
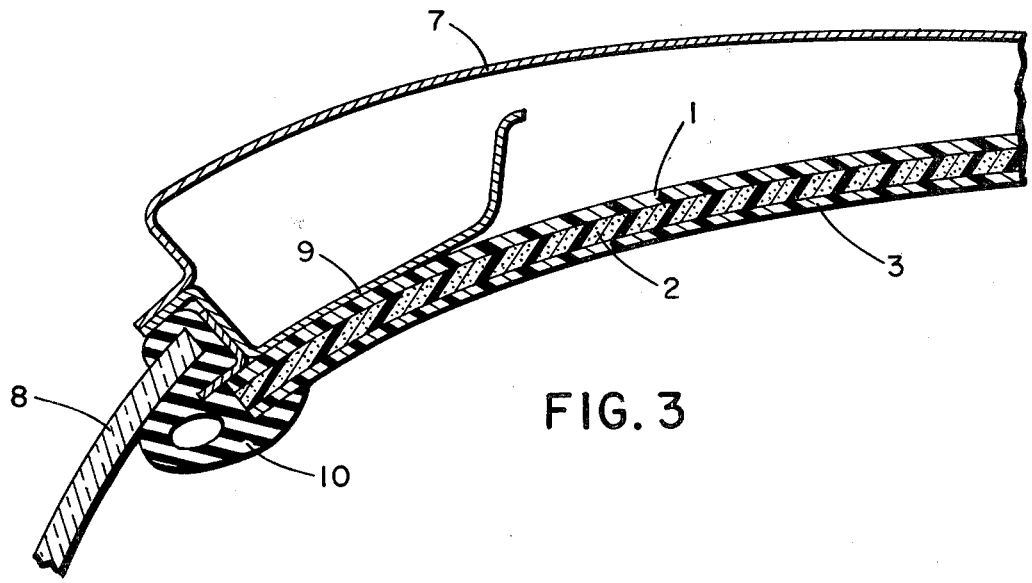
FIG. 3 shows a cross-sectional view of the same roof plate in an assembled position, in relation to the windshield or rear-view window of a motor vehicle.

The roof plate as described above is mounted against the roof body 7 of the motor vehicle, by exploiting the elastic reaction of the self-supporting plate 1, that is, by forcing wings 4 and 5 against the shaped profiles 6 (FIG. 2) of the body sides of the motor vehicle and, as far as the transverse sides of the car are concerned (that is, the windshield and rear-view window), the self-supporting roof plate 1 is retained (FIG. 3) between the windshield and the rear-view window 8 and profile 9 of the roof body, by a rubber gasket 10, fashioned as in the case of traditional roof plates.

Also along the body sides (see FIG. 2) known rubber gaskets 11 are disposed having a retaining and finishing function.

The assemblage of the self-supporting roof plate of the present invention, while it exploits the elastic reaction of the self-supporting plate, allows at the same time for compensating for the possible small out-of-square or dimensional variations of the motor vehicle body.

The advantages of the roof plate according to this invention may be summarized in the following basic advantages: the ease and speed of assembly, low labor costs, high productivity, and as already stated, the ease of replacements when necessary.

What is claimed is:

1. A self-supporting roof plate for motor vehicles and the like, characterized in that said roof plate consists essentially of a composite structure comprising a plate of rigid thermoplastic material bonded to a layer of foamed plastic material having a thermo-acoustical insulating function, and a layer of an aesthetically pleasing plastic material, said multi-layer structure being so shaped as to include on opposite sides two hook-like or S-shaped arcuate strips forming elastically yielding strips, adapted for the assemblage of the structure against the roof body of the car, by snap-fitting said arcuate strips into grooves prearranged between the roof ceiling and the body sides of the vehicle.

2. A self-supporting roof-plate according to claim 1, characterized in that said rigid plate, forming the supporting means for the whole structure, is a box-type or similar structure.

3. A self-supporting roof plate according to claim 1 or claim 2, characterized in that said S-shaped strips are obtained by the thermo-forming of the composite structure.

* * * * *